United States Patent [19]
Schneider et al.

[11] Patent Number: 5,303,580
[45] Date of Patent: Apr. 19, 1994

[54] METHOD AND ARRANGEMENT FOR DETERMINING THE STATE OF DETERIORATION OF A CATALYZER

[75] Inventors: Erich Schneider, Kirchheim; Eberhard Schnaibel, Hemmingen, both of Fed. Rep. of Germany

[73] Assignee: Robert Bosch GmbH, Stuttgart, Fed. Rep. of Germany

[21] Appl. No.: 870,264

[22] Filed: Apr. 17, 1992

[30] Foreign Application Priority Data

Apr. 17, 1991 [DE] Fed. Rep. of Germany ....... 4112479

[51] Int. Cl.$^5$ ............................................. G01M 19/00
[52] U.S. Cl. ..................................... 73/118.1; 123/672
[58] Field of Search .................... 73/118.1; 60/277; 123/672

[56] References Cited

U.S. PATENT DOCUMENTS

| | | | |
|---|---|---|---|
| 3,962,866 | 6/1976 | Neidhard et al. | 60/276 |
| 4,007,589 | 2/1977 | Neidhard et al. | 60/277 X |
| 5,154,055 | 10/1992 | Nakane et al. | 60/277 X |
| 5,159,810 | 11/1992 | Grutter et al. | 60/277 X |

FOREIGN PATENT DOCUMENTS 3500594  7/1986  Fed. Rep. of Germany.

*Primary Examiner*—Jerry W. Myracle
*Attorney, Agent, or Firm*—Walter Ottesen

[57] ABSTRACT

The invention is directed to a method of determining the performance loss of a catalyzer by using a deterioration variable indicative of this performance loss. The catalyzer is affected by operating conditions and is mounted in the exhaust gas flow of an internal combustion engine having a lambda controller operated to provide a two-level response. The method includes the steps of: obtaining a measurement signal from a lambda probe mounted forward of the catalyzer and a test signal from a lambda probe mounted rearward of the catalyzer; forming a relationship between the measurement and the test signals; measuring values of operating variables which affect oxygen storage processes in the catalyzer; and, correcting the deterioration variable based on the values of the operating variables thereby reducing the influence of the operating conditions on the deterioration variable. Because the deterioration variable can be corrected in the manner described above, this variable can be reliably determined for many different operating conditions rather than only for a few selected operating conditions.

9 Claims, 3 Drawing Sheets

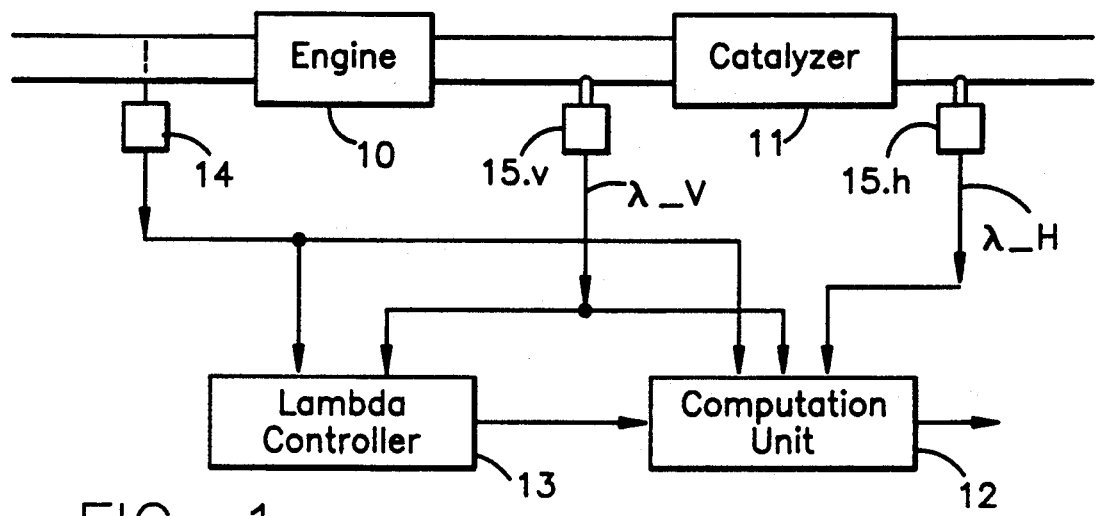
FIG. 1
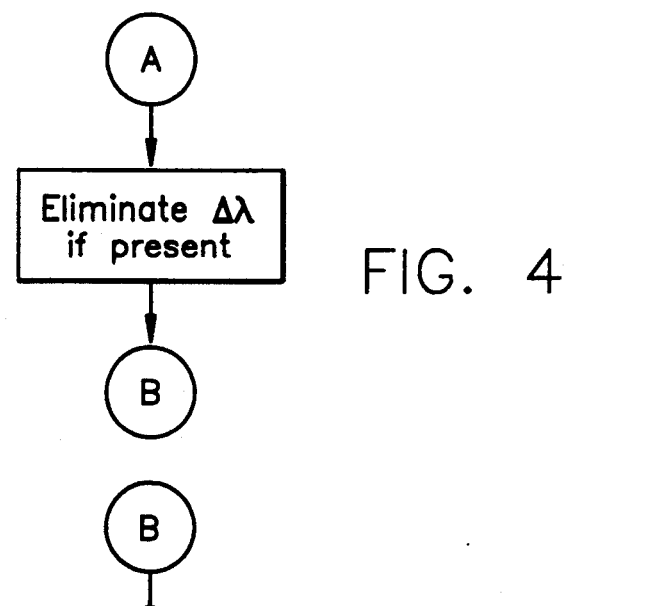
FIG. 4
FIG. 5
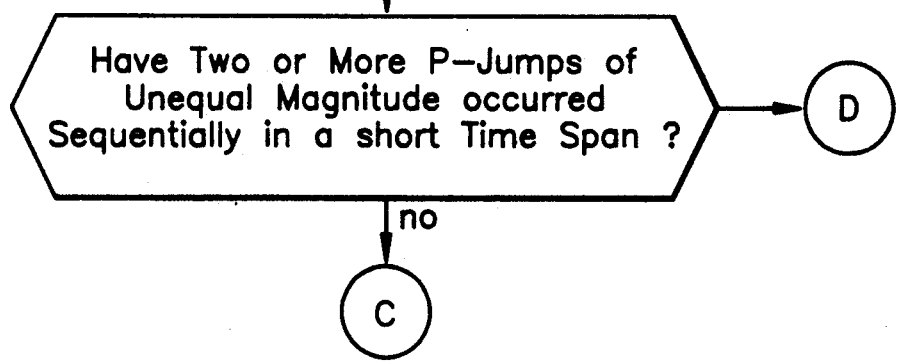

METHOD AND ARRANGEMENT FOR DETERMINING THE STATE OF DETERIORATION OF A CATALYZER

FIELD OF THE INVENTION

The invention relates to a method and an arrangement for determining the performance loss (state of deterioration) of a catalyzer which is mounted in the exhaust gas flow of an internal combustion engine.

BACKGROUND OF THE INVENTION

It has long been known that the efficiency of a catalyzer deteriorates with increasing operating age. Various methods and arrangements are known to determine the state of deterioration of the catalyzer. Most of these methods and arrangements establish a relationship between a measuring signal and a test signal to determine the value of a deterioration variable with the measuring signal being detected by a lambda probe mounted forward of the catalyzer and the test signal being detected by a lambda probe mounted rearward of the catalyzer. For example, U.S. Pat. No. 3,962,866 discloses a catalyzer monitoring system wherein the deterioration state is defined with the aid of the difference between the amplitudes of these two signals. A warning signal is emitted as soon as the difference drops below a threshold value. German published patent application 3,500,594 discloses an arrangement wherein the ratio of the amplitudes is used in lieu of the difference with the signal being, in addition, averaged.

Forming a relationship between the measuring signal and the test signal permits the influence of various operating conditions on the deterioration variable to be reduced. If a measuring signal having a large amplitude occurs forward of the catalyzer, that is exhaust gas is supplied to the catalyzer having a large deviation from the lambda value one, it is understood that the amplitude of the lambda signal at the output of the catalyzer also increases since, with the same storage capacity of the catalyzer, that much more unconverted toxic gas exits from the catalyzer the greater the amount supplied at the input of the catalyzer. By means of establishing the above-mentioned relationship and especially the quotient formation, the influence of a large measuring signal on the deterioration variable is greatly reduced.

However, it has been shown that the above-mentioned measures notwithstanding, there are still large fluctuations of the computed deterioration variable which have been observed. The reason for this will be explained in greater detail below. In any event, it has long been a desire to reduce these fluctuations in the deterioration variable by an appropriately configured method and an appropriately configured arrangement.

SUMMARY OF THE INVENTION

The method of the invention distinguishes from the above-described methods in that, in order to reduce the influence of various operating conditions on the deterioration state variable, actual values of such operating state variables are detected which affect the oxygen storage capacity in the catalyzer and the deterioration variable is corrected based on these values.

The arrangement according to the invention includes the above-mentioned probes for detecting the measuring signal and the test signal and a unit for relating these two signals to each other. In addition, and according to a feature of the invention, the arrangement includes a correcting unit for correcting the deterioration variable on the basis of actual values of such operating state variables which affect the oxygen storage operations in the catalyzer.

The operating variables which are detected include especially the controller position, the controller frequency and the air-mass flow. First, the conventionally computed deterioration variable is reduced with increasing enlargement of the deviation of the controller position from the lambda value one and with increasing air-mass flow while the deterioration variable is increased with increasing controller frequency. An especially significant advantage is that the deterioration variable is determined only when the test signals for rich and lean mixture follow each other at the spacing of the controller period. Then it is certain that the catalyzer fluctuates always between a first state wherein the catalyzer is completely filled with oxygen and a second state wherein it is entirely empty of oxygen. In this way, well defined output states for the oxygen storage sequence in the catalyzer are present. This, in turn, leads to especially reliable values for the deterioration variable.

BRIEF DESCRIPTION OF THE DRAWINGS

The invention will now be described with reference to the drawings wherein:

FIG. 1 is a schematic of a catalyzer having a lambda probe in the exhaust gas flow forward of the catalyzer and a lambda probe in the exhaust gas flow rearward of the catalyzer;

FIG. 4 shows a method step which can be interposed between the marks A and B in the flowchart of FIG. 3 and in which case, the step s5 in FIG. 3 is deleted; and, FIG. 5 shows a flowchart step which can be interposed at the position of step s2 between the marks B and C in FIG. 3.

DESCRIPTION OF THE PREFERRED EMBODIMENTS OF THE INVENTION

Figure 2:
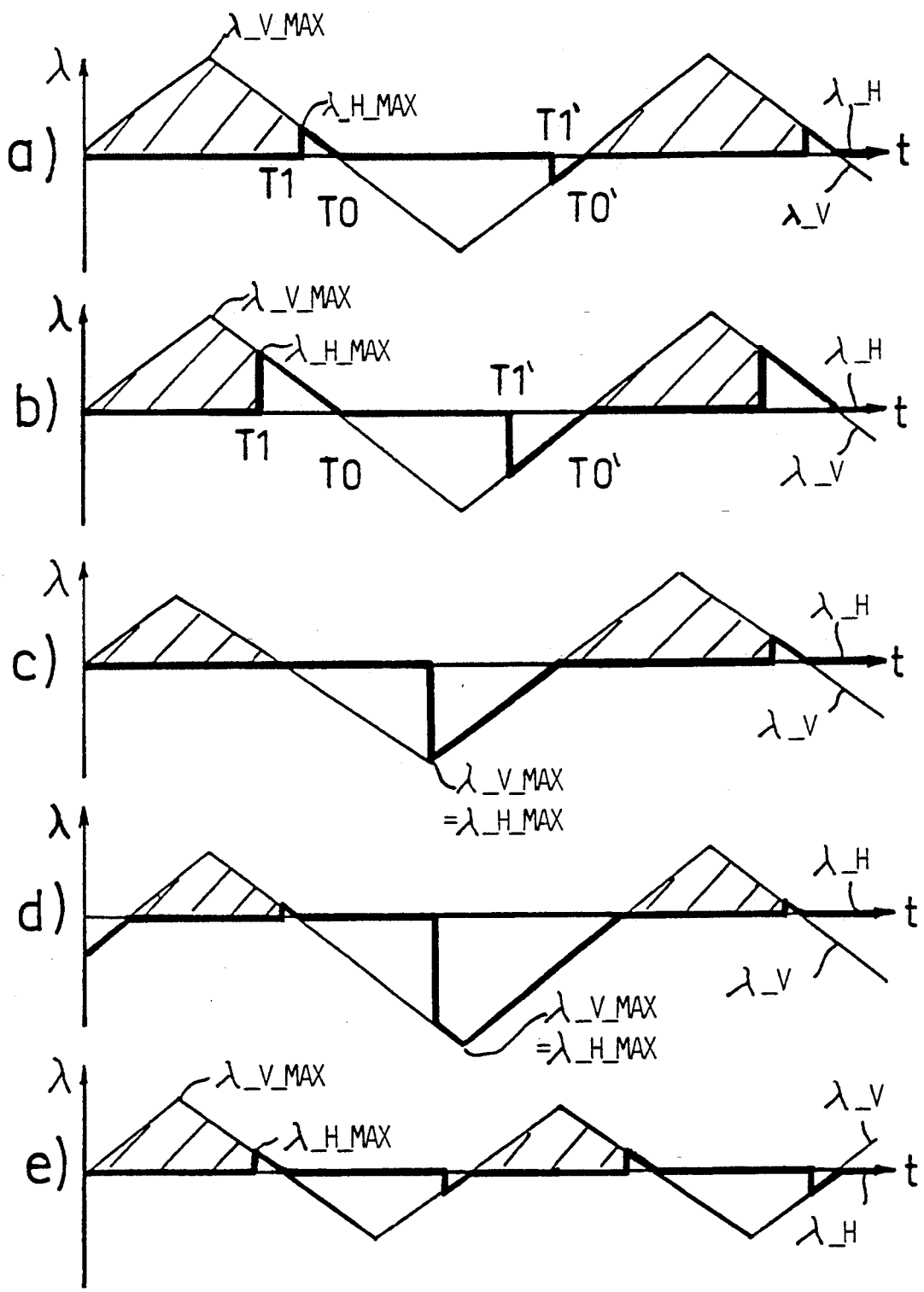
FIGS. 2a to 2e show idealized time-dependent traces of lambda values forward (thin lines) and rearward (thick lines) of a catalyzer.

FIG. 1 shows a schematic of an internal combustion engine 10, a catalyzer 11, and function groups for evaluating the state of deterioration of the catalyzer, namely, a computation unit 12 and a lambda controller 13. An air-flow sensor 14 is mounted in the intake pipe of the engine 10 and provides a signal which is supplied to the computation unit as well as to the lambda controller. In the exhaust gas pipe between the engine and the catalyzer, a forward lambda probe 15.v is mounted having a lambda value signal $\lambda\_V$ which is likewise supplied to the lambda controller and the computation unit 12. A rearward lambda probe 15.h is mounted rearward of the catalyzer and provides a lambda value signal $\lambda\_H$ which is supplied to the computation unit 12.

The computation unit 12 determines the maximum values of the signals $\lambda\_V$ and $\lambda\_H$ as measuring signal and test signal, respectively, and computes a preliminary value for the deterioration state AZ of the catalyzer 11 from the relationship of these signals to each other in a conventional manner. In the following, it is assumed that the preliminary value is computed by means of the quotient of the test signal to the measurement signal, that is, $\lambda\_H\_MAX/\lambda\_V\_MAX$.

FIG. 2a shows with a thin line an idealized time-dependent trace of the lambda value $\lambda\_V$ under the assumption that a two-level control is carried out on the engine with an exclusively integral response with the exhaust gas of the engine being supplied to the catalyzer 11. Furthermore, it is assumed that the time-dependent trace of the signal $\lambda\_V$ corresponds precisely without distortion to the time-dependent trace of the fuel quantity metered to the engine by the lambda controller. Finally, it is assumed that the control takes place to the lambda value one. This means that the triangular oscillation of the signal $\lambda\_V$ is symmetrical with reference to the lambda value one. This, in turn, has the consequence that with a sufficiently large storage capacity of the catalyzer, just so much oxygen is stored in the catalyzer in the lean phase as is taken therefrom in the following rich phase for oxidizing exhaust gas components which have not yet been combusted.

FIG. 2a as well as FIGS. 2b to 2e relate however to a catalyzer which is in a deterioration state in which it is no longer able to store all the oxygen which arrives during the lean phase. At that time point at which the oxygen storage volume of the catalyzer is exhausted, oxygen exits at the outlet of the catalyzer and, for this reason, the lambda value $\lambda\_H$ increases to values greater than one. Here, for a clear explanation as to the effects observed, it can be assumed that the catalyzer is filled abruptly with oxygen and then, at its output, essentially the same lambda value is measured as at its input. In practice, the oxygen store does not fill abruptly but instead slowly.

In FIG. 2a, T1 defines the time point at which the lambda value $\lambda\_H$ jumps to the lambda value $\lambda\_V$ for the reason mentioned above. Up to time point T0, at which the signal $\lambda\_V$ drops below the value one, the signal traces of $\lambda\_V$ and $\lambda\_H$ are coincident. The signal $\lambda\_H$ is shown with a thick line. From time point T0, the oxygen store is emptied. It is assumed that the oxygen store is abruptly empty at time point T1 whereupon uncombusted exhaust gas components penetrate through the catalyzer 11 to the rearward lambda probe 15.h. This has as a consequence that from time point T1', the time-dependent trace of $\lambda\_H$ corresponds to that of $\lambda\_V$. This applies up to time point T0' at which the lambda value one is exceeded coming from rich values. The storage of oxygen then begins anew.

In FIG. 2a, the amplitude of the signal $\lambda\_V$ is identified by $\lambda\_V\_MAX$ and the amplitude of the signal $\lambda\_H$ is identified by $\lambda\_H\_MAX$. These values define the measurement signal and the test signal, respectively. The quotient $\lambda\_H\_MAX/\lambda\_V\_MAX$ is the deterioration variable AZ.

In FIG. 2a, as in FIGS. 2b to 2e, the particular area below the signal $\lambda\_V$ is shown hatched in the time spans in which oxygen is stored in the catalyzer. In this way, it can be easily seen that the termination of the storage operation because of an overflow of the store corresponds to the time point T1 of the change of the lambda value $\lambda\_H$. It is furthermore directly apparent that with the reduction of the storage capacity of the catalyzer, the time point T1 is shifted further forward. One such case is shown in FIG. 2b. The earlier the time point T1 lies, the greater is the value $\lambda\_H\_MAX$ to which the signal $\lambda\_H$ jumps (assuming T1 does not lie in the increasing region of $\lambda\_V$ of lambda value one to the lambda value $\lambda\_V\_MAX$ in the lean region).

FIGS. 2c to 2e show cases wherein the value of $\lambda\_H\_MAX$ changes because of special conditions in the operating condition of the engine and not because of a change of the deterioration state of the catalyzer.

FIG. 2c shows the case wherein the lambda signal $\lambda\_V\_MAX$ remains too small during an oscillating period of the lambda controller. It is assumed that it is that signal in the lean region. Then, the catalyzer cannot store as much oxygen as it actually still could store notwithstanding its advanced deterioration. This, in turn, has the consequence that already after a short time in the rich phase, the oxygen stored in the catalyzer is completely consumed so that the signal $\lambda\_H\_MAX$ is already reached when the signal $\lambda\_V$ still has a very high value.

FIG. 2d relates to the case wherein the control position is shifted toward rich. In this case, the lean phase is always shorter than the rich phase. In this case too, the oxygen stored during the lean phase is already consumed at a considerably earlier time point than it would otherwise have been consumed at the end of the rich phase. A larger value for $\lambda\_H\_MAX$ then results from the foregoing.

FIG. 2e is directed to the case wherein the control frequency is increased. Here, it is first assumed that the air-mass flow is unchanged. Because of the increased control frequency, the phase is shortened in which the oxygen stored during the lean phase is consumed. In this way, only a shortened time duration lies between the time points T1 and T0 which, in turn, has the consequence that the value of $\lambda\_H$ jumps to a lower value $\lambda\_H\_MAX$. However, it should be noted that the increase of the control frequency operates less on $\lambda\_H\_MAX$ as shown above since the increase of the control frequency is caused mostly by an increased air-mass flow. An increased air-mass flow however leads to a shortened attainment of the saturation condition or of the empty state of the catalyzer with reference to oxygen whereby the time span between T1 and T0 is again lengthened.

From the foregoing it is apparent that the deterioration variable AZ computed from the ratio $\lambda\_H\_MAX/\lambda\_V\_MAX$ increases with increasing deviation of the control position from the lambda value one and with increasing air-mass flow; however, with an increase of the control frequency, the deterioration variable is reduced. Accordingly, the deterioration variable AZ is in each case corrected in the reverse direction when such changes of control position, of air-mass flow and/or of control frequency are determined. How this correction can take place will now be explained with the aid of FIG. 3.

Figure 3:
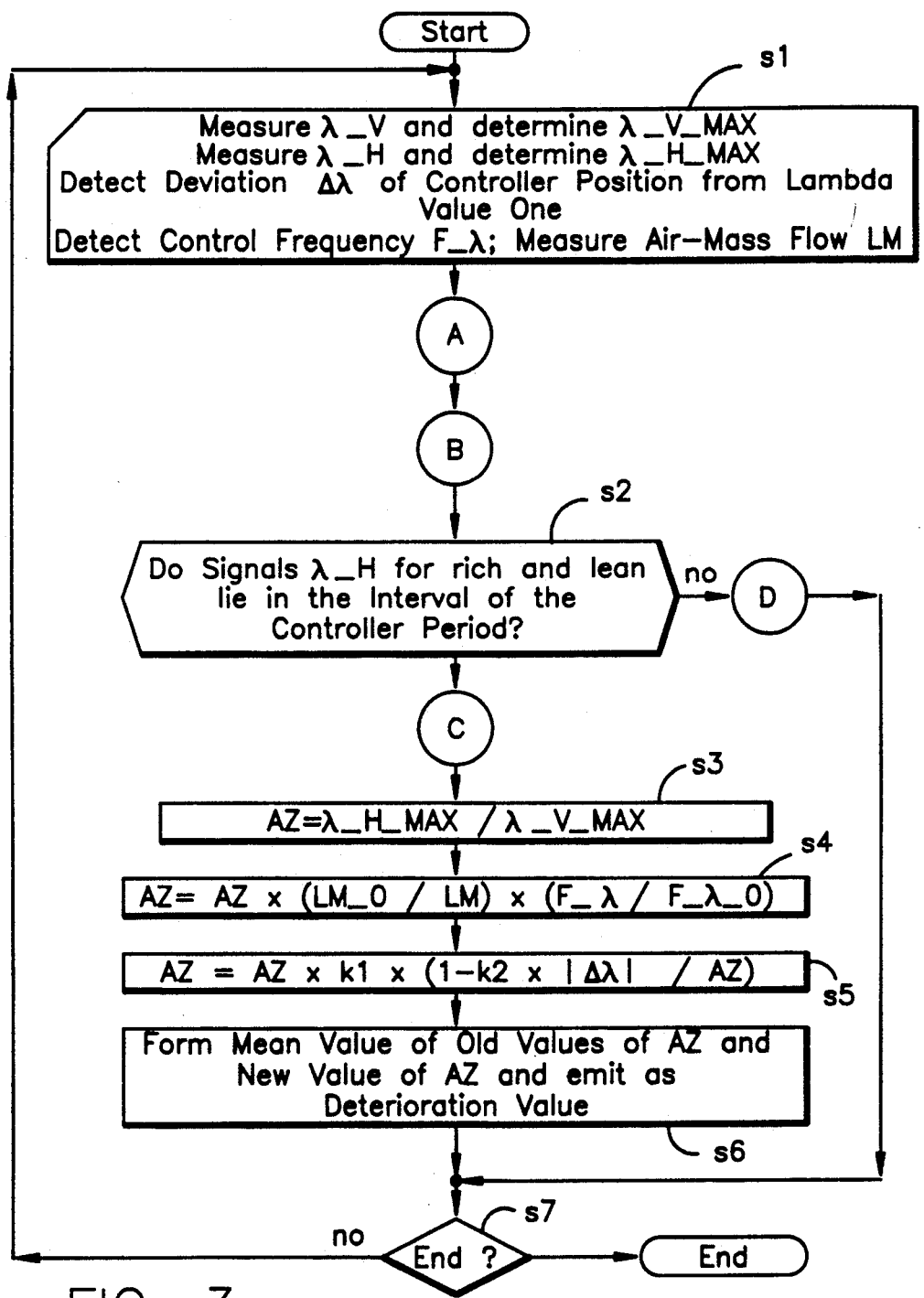
FIG. 3 is a flowchart of a method for correcting the value of the deterioration variable in dependence upon values of operating conditions of the internal combustion engine.

In step s1 of the flowchart of FIG. 3, the signals $\lambda\_V$, $\lambda\_H$, $\Delta\lambda$, $F\_\lambda$ and LM are detected. $\Delta\lambda$ is the deviation of the control position from the lambda value one, $F\_\lambda$ is the control frequency and LM is the inducted air-mass flow. Furthermore, in step s1, the measuring signal $\lambda\_V\_MAX$ and the test signal $\lambda\_H\_MAX$ are determined for each half period of a controller oscillation.

A decision step s2 is reached via two marks A and B wherein a check is made as to whether the test signals for rich and lean lie at the interval of the controller period. If this is the case, the program continues with a step s3 via a mark C. In step s3, the preliminary value of the deterioration variable AZ is formed in the conventional manner as a ratio $\lambda\_H\_MAX/\lambda\_V\_MAX$. Thereafter, in step s4, this value is corrected with the aid of the values LM and $F\_\lambda$ as described in FIG. 3 in step s4. Here, $LM\_0$ is a standard air-mass flow and $F\_\lambda\_0$ is a standard controller frequency. A further correction of AZ takes place on the basis of value $\Delta\lambda$ in step s5 in FIG. 3 in the manner shown. Here, k1 and k2 are constants. The original value of AZ which has been corrected several times in this manner is averaged in step s6 with previously determined corrected values of AZ. Finally, an investigation is made in step s7 as to whether the method should be ended. If this is not the case, then the sequence is repeated starting with step s1.

The last step s7 is also reached starting from step s2 via a mark D when it occurs that the test signals for rich and lean do not lie in essentially the interval of the controller period. This means that at least one of the test signals for rich and/or lean has not occurred. This, in turn, means that charging the catalyzer with oxygen or emptying the same has taken place starting from an undefined state so that the test signal is dependent less on the deterioration state of the catalyzer than on the start state of the filling or emptying state as shown in FIG. 2c. With the aid of step s2, a change of the value of AZ applicable previously should be avoided when the case of FIG. 2c occurs. This can occur especially with a two-point controller having dissimilarly large P-jumps to rich and to lean (larger jumps in the direction of rich).

The method just described above can be easily modified so that step s5 of the correction of the control position can be deleted and therefor, a step is interposed between the above-mentioned marks A and B as shown in FIG. 4. According to this step, a deviation $\Delta\lambda$ of the control position is eliminated from the lambda value before the actual value of the deterioration variable AZ is determined.

Furthermore, the method of FIG. 3 can be so modified that step s2 between the marks B, C and D is substituted by the step shown in FIG. 5. Here, an investigation is made as to whether two or more P-jumps of dissimilar magnitude take place sequentially in a short time span. As already explained, this measure acts to eliminate difficulties as they occur in cases shown by means of FIG. 2c.

It is noted that not all measures explained with respect to FIGS. 3 to 5 must be used to correct the value of the deterioration variable AZ or to omit the new determination of this variable. Rather, each of the measures individually or in combination can be applied as described above. Also, it is insignificant as to how the deterioration variable to be corrected is computed.

Because the deterioration variable is corrected in the manner described above, it is possible to determine this variable in a reliable manner during many operating conditions and not only during a few selected operating conditions.

It is understood that the foregoing description is that of the preferred embodiments of the invention and that various changes and modifications may be made thereto without departing from the spirit and scope of the invention as defined in the appended claims.

What is claimed is:

1. A method of determining the performance loss of a catalyzer by using a deterioration variable indicative of said performance loss, the catalyzer is affected by operating conditions and is mounted in the exhaust gas flow of an internal combustion engine having a lambda controller operated to provide a two-level response, the method comprising the steps of:

obtaining measurement signal from a lambda probe mounted forward of the catalyzer and a test signal from a lambda probe mounted rearward of the catalyzer;

forming a relationship between said measurement and said test signals and computing the deterioration variable from said relationship;

measuring values of operating variables which affect oxygen storage processes in said catalyzer; and, correcting said deterioration variable based on said values of said operating variables thereby reducing the influence of said operating conditions on said deterioration variable.

2. The method of claim 1 further comprising the steps of:

determining the deviation $\Delta\lambda$ of the control position to the lambda value one; and, reducing the deterioration variable with increasing magnitude of said deviation $\Delta\lambda$.

3. The method of claim 1 further comprising the step of eliminating a deviation $\Delta\lambda$ of said control position from said lambda value one before said deterioration variable is computed.

4. The method of claim 1 further comprising the steps of:

measuring the air-mass flow inducted by the engine and the frequency of the lambda controller; and, reducing said deterioration variable with increasing air-mass flow and increasing said deterioration variable with increasing controller frequency.

5. The method of claim 1 further comprising the step of temporarily interrupting the evaluation of said deterioration variable when two or more P-jumps occur sequentially at a short interval when the lambda control is carried out with unequal P-components.

6. The method of claim 1 further comprising the step of only evaluating said deterioration variable when said test signals for rich mixture and lean mixture sequentially follow at intervals of the control period.

7. The method of claim 1, wherein said step of measuring values is carried out by measuring values of operating variables of at least one of the engine and the lambda controller which affect oxygen storage processes in said catalyzer.

8. An arrangement for determining the performance loss of a catalyzer in the exhaust gas flow of an internal combustion engine having a lambda controller operated to provide a two-level response, the arrangement comprising:

a first lambda probe mounted forward of the catalyst for detecting a measurement signal;

a second lambda probe mounted rearward of the catalyzer for detecting a test signal;

computation means for forming a relationship between said measurement and test signals and for computing a deterioration variable from said relationship;

detecting means for detecting an operating variable of at least one of said engine and said lambda controller; and, said computation means being adapted for correcting said deterioration variable in dependence upon said operating variable in such a manner that various operating conditions affect said deterioration variable as little as possible.

9. The arrangement of claim 8, wherein said engine includes an air intake pipe and said detecting means is an air-mass flow detecting mounted in said intake pipe of said engine.

* * * * *

UNITED STATES PATENT AND TRADEMARK OFFICE
CERTIFICATE OF CORRECTION

PATENT NO. : 5,303,580
DATED : April 19, 1994
INVENTOR(S) : Erich Schneider and Eberhard Schnaibel It is certified that error appears in the above-identified patent and that said Letters Patent is hereby corrected as shown below:

In column 6, line 1: between "obtaining" and "measurement", insert -- a --.

In column 6, line 48: delete "catalyst" and substitute -- catalyzer -- therefor.

In column 6, line 66: delete "detecting" and substitute -- detector -- therefor.

Signed and Sealed this

Sixteenth Day of August, 1994

Attest:

BRUCE LEHMAN

*Attesting Officer*     *Commissioner of Patents and Trademarks*